(12) United States Patent
Noguchi et al.

(10) Patent No.: US 10,360,151 B2
(45) Date of Patent: Jul. 23, 2019

(54) CACHE MEMORY SYSTEM INCLUDING FIRST CACHE MEMORY AND SECOND CACHE MEMORY HAVING MULTIPLE REGIONS WITH DIFFERENT ACCESS SPEED AND PROCESSOR SYSTEM

(71) Applicant: KABUSHIKI KAISHA TOSHIBA, Tokyo (JP)

(72) Inventors: Hiroki Noguchi, Kanagawa (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 143 days.

(21) Appl. No.: 15/262,692

(22) Filed: Sep. 12, 2016

(65) Prior Publication Data

US 2017/0075808 A1 Mar. 16, 2017

(30) Foreign Application Priority Data

Sep. 16, 2015 (JP) ................................ 2015-183218

(51) Int. Cl.
*G06F 12/123* (2016.01)
*G06F 12/0804* (2016.01)
*G06F 12/0811* (2016.01)
*G06F 12/0866* (2016.01)
*G06F 12/0897* (2016.01)

(52) U.S. Cl.
CPC ...... *G06F 12/0811* (2013.01); *G06F 12/0804* (2013.01); *G06F 12/0866* (2013.01); *G06F 12/0897* (2013.01); *G06F 12/123* (2013.01); *G06F 2212/1024* (2013.01); *G06F 2212/222* (2013.01); *G06F 2212/225* (2013.01); *G06F 2212/62* (2013.01); *Y02D 10/13* (2018.01)

(58) Field of Classification Search
None
See application file for complete search history.

(56) References Cited

U.S. PATENT DOCUMENTS 5,440,707 A 8/1995 Hayes et al.
6,295,580 B1 9/2001 Sturges et al.
(Continued)

FOREIGN PATENT DOCUMENTS

JP 3370683 1/2003
JP 3473772 9/2003
(Continued)

OTHER PUBLICATIONS

Jadidi et al.; "High-Endurance and Performance-Efficient Design of Hybrid Cache Architectures Through Adaptive Line Replacement", ISLPED, IEEE, pp. 79-84, (2011).

*Primary Examiner* — Jared I Rutz
*Assistant Examiner* — Marwan Ayash
(74) *Attorney, Agent, or Firm* — Finnegan, Henderson, Farabow, Garrett & Dunner, L.L.P.

(57) ABSTRACT

A cache memory system has a first cache memory, a second cache memory which comprises a nonvolatile memory capable of generating a plurality of regions having different access speeds and has access priority lower than the first cache memory, and a cache controller which carries out a control where data to be stored in the second cache memory is sorted to the plurality of regions and stored thereto in accordance with access conditions with respect to the first cache memory.

18 Claims, 6 Drawing Sheets

(56) References Cited

U.S. PATENT DOCUMENTS

| | | | |
|---|---|---|---|
| 2009/0292857 A1 | 11/2009 | Tanabe | |
| 2013/0046920 A1* | 2/2013 | Ryu | G06F 12/0246 711/103 |
| 2013/0279244 A1* | 10/2013 | Kang | G11C 11/161 365/158 |
| 2014/0177325 A1 | 6/2014 | Dong et al. | |
| 2014/0207995 A1* | 7/2014 | Benhase | G06F 12/0246 711/102 |
| 2014/0281189 A1 | 9/2014 | Noguchi et al. | |
| 2015/0113214 A1 | 4/2015 | Sutardja | |
| 2015/0332750 A1* | 11/2015 | Dong | H01L 43/12 365/158 |

FOREIGN PATENT DOCUMENTS

| | | |
|---|---|---|
| JP | 5129023 | 1/2012 |
| JP | 2014-179150 | 9/2014 |

* cited by examiner

CACHE MEMORY SYSTEM INCLUDING FIRST CACHE MEMORY AND SECOND CACHE MEMORY HAVING MULTIPLE REGIONS WITH DIFFERENT ACCESS SPEED AND PROCESSOR SYSTEM

CROSS REFERENCE TO RELATED APPLICATIONS

This application is based upon and claims the benefit of priority from the prior Japanese Patent Application No. 2015-183218, filed on Sep. 16, 2015, the entire contents of which are incorporated herein by reference.

FIELD

An embodiment relates to a cache memory system and a processor system including a nonvolatile memory.

BACKGROUND

Since a static random access memory (SRAM) is large in standby energy and high in price, cache memories using nonvolatile memories have been researched. Among the nonvolatile memories, a magnetoresistive random access memory (MRAM) has high rewriting resistance, and is capable of realizing small cell size and high integration. However, from a point of view of access speed, the SRAM is far beyond the MRAM. In general, access speed and memory capacity have a trade-off relationship. Increase in the memory capacity lowers the access speed, while decrease in the memory capacity improves the access speed.

For example, in a case where a nonvolatile memory such as the MRAM and the like is used for a cache memory in lower-level, this cache memory may be concentratively accessed depending on application software executed by a processor. Therefore, compared to one that includes the SRAM, there is a possibility that processing performance may fall.

DETAILED DESCRIPTION

According to one embodiment, a cache memory system has a first cache memory, a second cache memory which comprises a nonvolatile memory capable of generating a plurality of regions having different access speeds and has access priority lower than the first cache memory, and a cache controller which carries out a control where data to be stored in the second cache memory is sorted to the plurality of regions and stored thereto in accordance with access conditions with respect to the first cache memory.

Hereinafter, an embodiment will be described in detail with reference to the accompanying drawings.

Figure 1:
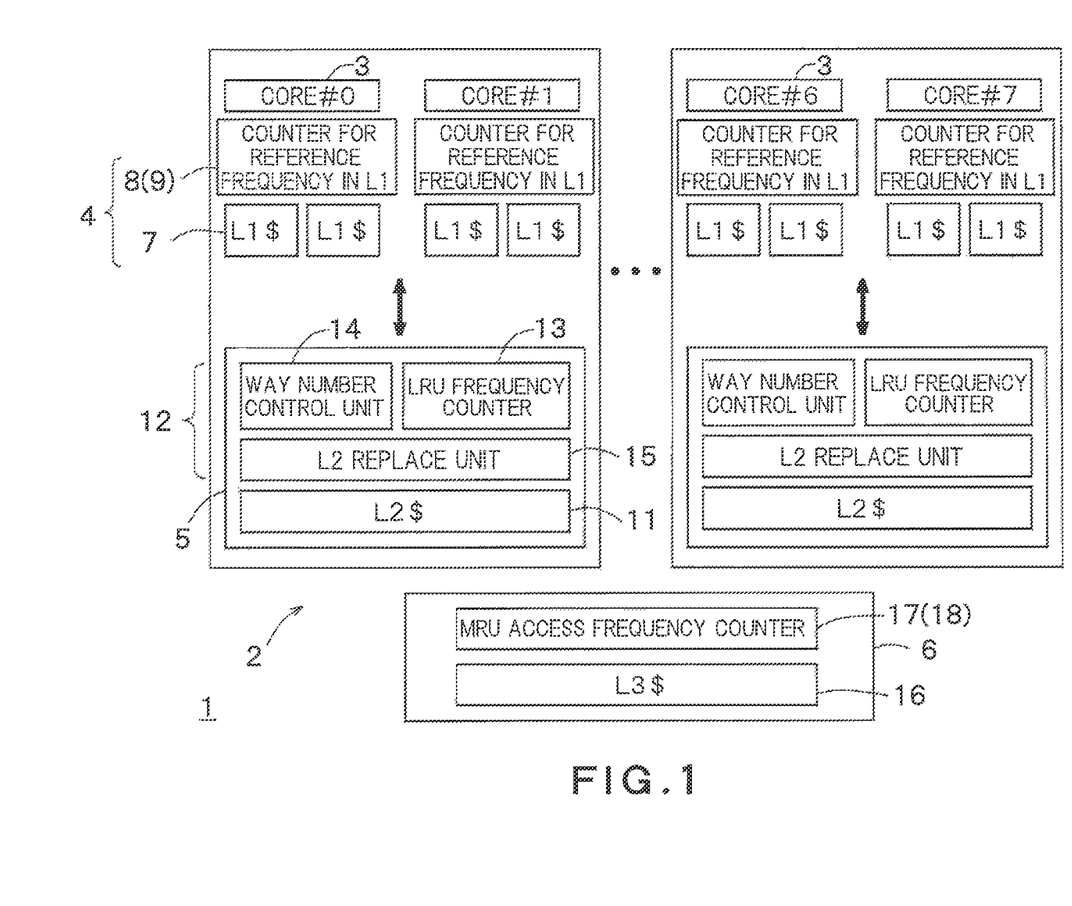
FIG. 1 is a block diagram illustrating a schematic configuration of a processor system 2 including a cache memory system 1 according to an embodiment.

FIG. 1 is a block diagram illustrating a schematic configuration of a processor system 2 including a cache memory system 1 according to the embodiment. FIG. 1 illustrates that the processor system 2 has a multi-core configuration including eight processor cores (CPU) 3, but it should not be restricted to such numbers. The processor core 3 may be a single-core.

The cache memory system 1 inside the processor system 2 includes a primary cache memory (hereinafter, L1 cache, first-level cache memory) 4, a second-level cache memory (hereinafter, L2 cache, second cache memory) 5, and a third-level cache memory (hereinafter, L3 cache, third cache memory) 6. The L1 cache 4 is a highest-level cache memory of highest access priority. The L2 cache 5 is a cache memory of second highest access priority, next to the L1 cache 4. The L3 cache 6 is a cache memory of third highest access priority, next to the L2 cache 5. A lower-level of the L3 cache 6 may be provided with a cache memory not illustrated or a main memory not illustrated.

The L1 cache 4 is provided per processor core 3. In an example illustrated in FIG. 1, the L2 cache 5 is provided for each two L1 caches 4. Note that the L2 cache 5 may be provided per any number of the L1 caches 4. In the example illustrated in FIG. 1, the L3 cache 6 is provided for each four L2 caches 5. Note that the L3 cache 6 may be provided per any number of the L2 caches 5.

The L1 cache 4 includes an L1 data memory and L1 tag memory (L1$) 7, and an L1 cache controller 8. The L1 cache controller 8 includes a counter 9 for reference frequency in L1 (first access frequency measurement circuitry).

The L1 cache 4 has, for example, memory capacity of 32 KB. The L1 data memory and L1 tag memory 7 includes, for example, an SRAM.

The L1 reference frequency counter 9 is provided per cache line of the L1 cache 4. The L1 reference frequency counter 9 carries out a count-up whenever a corresponding cache line is accessed.

The L2 cache 5 includes an L2 data memory and L2 tag memory (L2$) 11, and an L2 cache controller 12. The L2 cache controller 12 includes an LRU access frequency counter (second access frequency measurement circuitry) 13, a way number control unit (way allocation controller) 14, and an L2 replace unit (distributor) 15.

The L2 cache 5 has, for example, memory capacity of 256 KB. The L2 data memory includes a nonvolatile memory such as a spin transfer torque (STT)-MRAM and the like. The L2 tag memory includes, for example, the SRAM.

The L2 data memory includes, as mentioned later, a high-speed region capable of high-speed access and a low-speed region with access speed lower than that of the high-speed region. The high-speed region and the low-speed region each may be allocated to fixed dispositions inside the L2 data memory. Alternatively, the dispositions of the high-speed region and the low-speed region may be made shiftable inside the L2 data memory. Furthermore, as mentioned later, memory sizes of the high-speed region and the low-speed region may be controlled so as to change the sizes arbitrarily.

The LRU access frequency counter 13 measures access frequency of data having the next highest possibility of eviction (for example, LRU data) among data in the L2 cache 5. In a typical example of implementation, the LRU access frequency counter 13 measures access frequency of a LRU point inside the L2 tag memory. Regardless of its name "least recently used (LRU)," note that the LRU access frequency counter 13 should not be necessarily restricted to a case of measuring the access frequency of the LRU point, but may measure the access frequency of the data having the next highest possibility of eviction.

The L2 replace unit 15 sets whether data to be stored in the L2 cache 5 should be stored in the high-speed region or in the low-speed region of the L2 cache 5.

The L3 cache 6 includes an L3 data memory and L3 tag memory (L3$) 16, and an L3 cache controller 17. The L3 cache controller 17 includes an MRU access frequency counter (third access frequency measurement circuitry) 18.

The L3 data memory includes, for example, the STT-MRAM. The L3 tag memory includes, for example, the SRAM.

The MRU access frequency counter 18 measures access frequency of data having the next lowest possibility of eviction (for example, MRU data) among data in the L3 cache 6. In a typical example of implementation, the MRU access frequency counter 18 measures access frequency of a MRU point inside the L3 tag memory. Regardless of its name "most recently used (MRU)," note that the MRU access frequency counter 18 should not be necessarily restricted to a case of measuring the access frequency of the MRU point, but may measure the access frequency of the data having the next lowest possibility of eviction.

Figure 2:
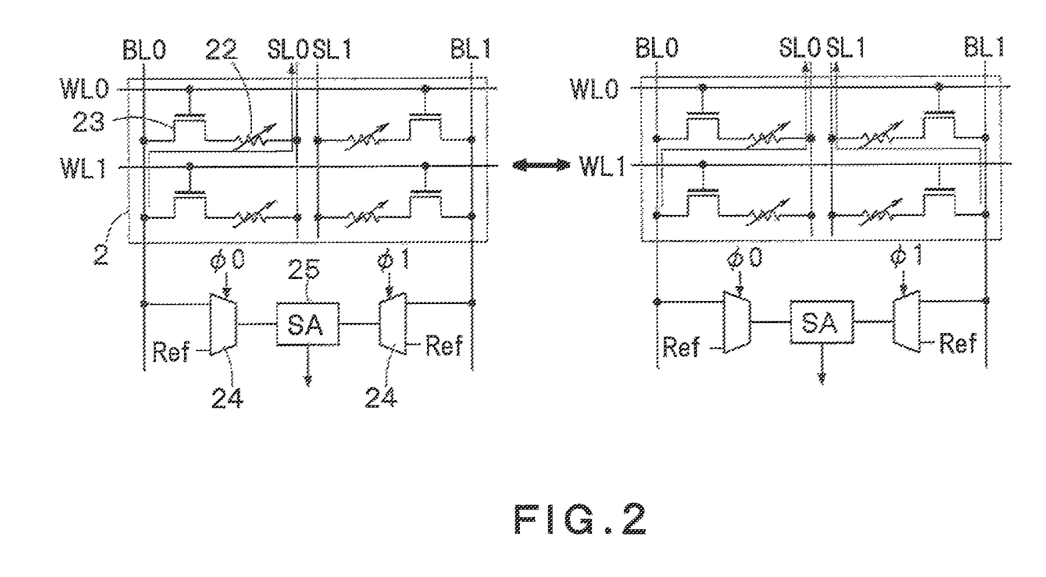
FIG. 2 is a circuit diagram illustrating an example of a circuit configuration of a memory cell array 21 inside an L2 cache 5.

FIG. 2 is a circuit diagram illustrating an example of a circuit configuration of a memory cell array 21 inside the L2 cache 5. FIG. 2 illustrates an example that each memory cell inside the memory cell array 21 is a magnetic tunnel junction (MTJ) cell 22. To the MTJ cell 22, a transistor 23 is connected in series. Furthermore, two mode selectors 24 and one sense amplifier (SA) 25 are provided for each four memory cells 22.

The L2 cache 5 in FIG. 2 has a 1T-1MTJ mode and a 2T-2MTJ mode. The 1T-1MTJ mode uses one transistor 23 and one MTJ cell 22 to carry out readout and writing. The 2T-2MTJ mode uses two transistors 23 and two MTJ cells 22 to carry out readout and writing.

In the 1T-1MTJ mode, data stored in one MTJ cell 22 is read out through a corresponding transistor 23 and is compared by the sense amplifier 25 with a reference voltage Ref so as to determine zero and one of the data.

In the 2T-2MTJ mode, data stored in two MTJ cells 22 are set to complement each other. Those complementary data are compared with each other by the sense amplifier 25 so as to determine 0 and 1 of the data.

The 1T-1MTJ mode can make a size of the memory cell 22 smaller than the 2T-2MTJ mode so that memory capacity can be increased. However, a readout voltage is small in the 1T-1MTJ mode so that a sense margin is decreased. Therefore, in a case of using the 1T-1MTJ mode, the low-speed region will be applicable.

In the 2T-2MTJ mode, the memory capacity is larger than in the 1T-1MTJ mode. However, the readout voltage is large so that the high-speed region will be applicable.

Preparing a 4T-4MTJ mode for carrying out readout and writing with four transistors 23 and four MTJ cells 22, the high-speed region will be applicable in a case of using the 4T-4MTJ mode, and the low-speed region will be applicable in a case of using the 1T-1MTJ mode or the 2T-2MTJ mode.

Alternatively, providing three or more modes such as the 1T-1MTJ mode, 2T-2MTJ mode, 4T-4MTJ mode, and the like, three or more regions may be provided. Note that each region herein has access speed different from each other.

As mentioned above, the L1 reference frequency counter 9 is provided per cache line of the L1 cache 4. However, in a case of simply counting the access frequency of each cache line, a circuit size of the L1 reference frequency counter 9 becomes extremely large. Accordingly, by using a saturating counter as the L1 reference frequency counter 9, it is possible to reduce the circuit size.

Figure 3:
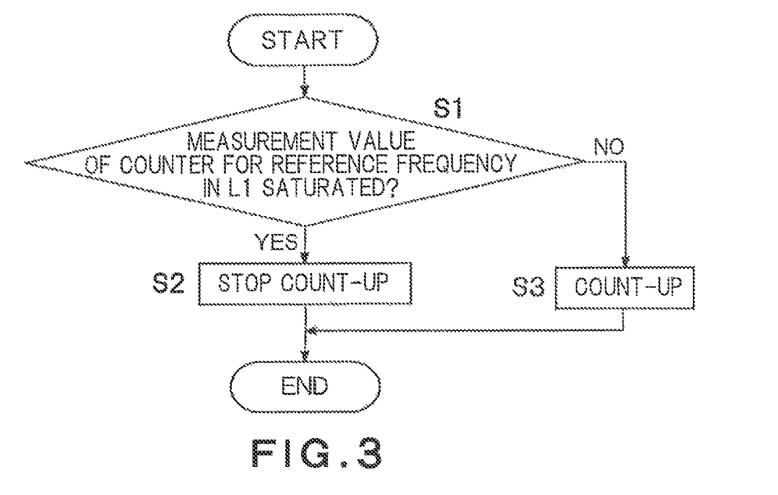
FIG. 3 is a flow chart illustrating an example of a measurement operation of a counter 9 for reference frequency in L1.

FIG. 3 is a flow chart illustrating an example of a measurement operation of the L1 reference frequency counter 9 in a case where the saturating counter is used as the L1 reference frequency counter 9. In a case of carrying out readout or writing of data with respect to the L2 cache 5, a measurement value of the L1 reference frequency counter 9 of a corresponding cache line of the L1 cache 4 is determined whether it is saturated (step S1) so as to grasp access conditions in the L1 cache 4 of data on which readout and writing should be carried out. When determined that the measurement value is not saturated, the L1 reference frequency counter 9 of the corresponding cache line is counted up (step S2).

When determined in step S1 that the measurement value is saturated, the measurement value of the L1 reference frequency counter 9 is maintained the status quo and a count-up operation is stopped (step S3).

In the flow chart in FIG. 3, once the measurement value of the L1 reference frequency counter 9 reaches a saturating value (predetermined value), the further measurement operation cannot be carried out. Therefore, under a necessity of carrying out the count-up operation with respect to the L1 reference frequency counter 9 in which the measurement value has once reached the saturating value, it may be possible to count down a measurement value of a counter 9 for reference frequency in L1 corresponding to another cache line different from the former L1 reference frequency counter 9. As a result, the counters 9 for the reference frequency in L1 carry out count-up and countdown. Therefore, it is possible to prevent such a malfunctioning that all of the counters 9 for reference frequency in L1 are saturated. In this case, there is a possibility that a counter 9 for reference frequency in L1 in which a measurement value will be a positive saturating value due to repetitive count-up coexists with a counter 9 for reference frequency in L1 in which a measurement value will be a negative saturating value due to repetitive countdown. However, in the present embodiment, the counters 9 for the reference frequency in L1 are used for determining whether the access frequency is high. Therefore, it is possible to determine that the access frequency is high from the L1 reference frequency counter 9 in which the measurement value has become the positive saturating value. In a case where accesses with respect to the L1 cache 4 are even, differences of the measurement values of the counters 9 for the reference frequency in L1 corresponding to each cache line become small. Therefore, if countdown can also be carried out, it is possible to detect with high accuracy a cache line with maximum access frequency.

In FIG. 1, the L1 cache 4 is a cache memory in a level higher than the L2 cache 5 including the high-speed region and the low-speed region. On the contrary, for example, in a case where the L3 cache 6 includes a high-speed region and a low-speed region, cache memories in levels higher than the L3 cache 6 are these two, that is, the L1 cache 4 and the L2 cache 5. In a case where there are cache memories in two or more levels higher than a cache memory including a nonvolatile memory with a high-speed region and a low-speed region, a measurement operation of a counter for reference frequency in L2 provided in the L2 cache 5 will be represented not by the flow chart in FIG. 3 but by the flow chart in FIG. 4.

Figure 4:
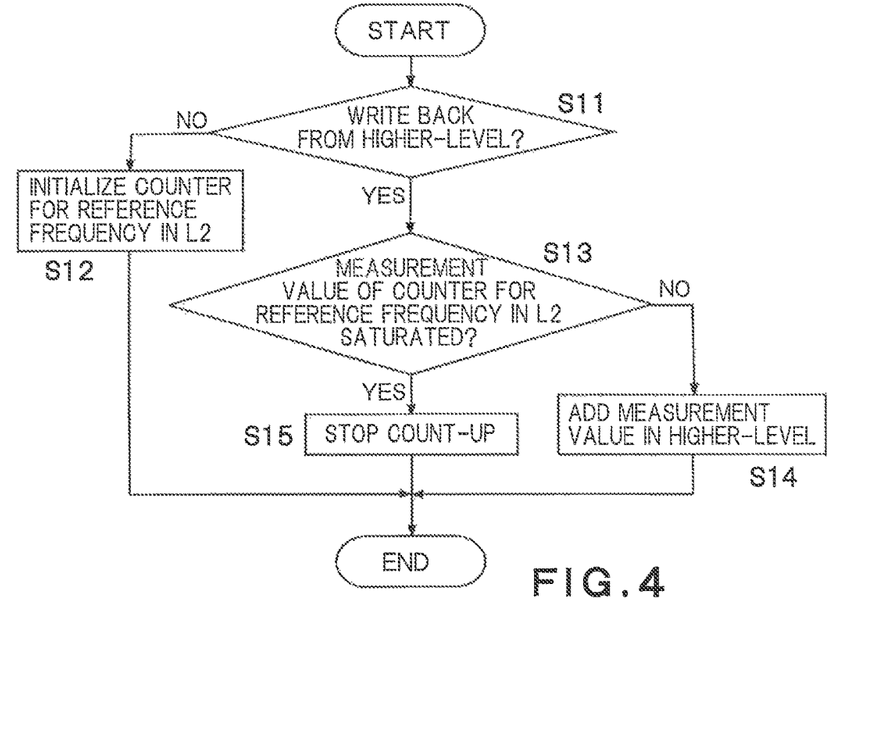
FIG. 4 is a flow chart illustrating another example of the measurement operation of the L1 reference frequency counter 9.

First, a writing access is determined whether it is write-back of data from the higher-level cache memories (step S11). If a result determined in step S11 is "NO," it is writing of data from the cache memory in the lower-level. Therefore, the L1 reference frequency counter 9 corresponding to a cache line to be written on is initialized to zero (step S12).

If the result determined in step S11 is "YES," the L2 reference frequency counter inside the L2 cache 5 is determined whether it is saturated (step S13). If the counter is not saturated, the measurement value of the L1 reference frequency counter 9 in the L1 cache 4 is added with the measurement value of the L2 reference frequency counter (step S14). On the other hand, the L2 reference frequency counter is determined in step S13 that it is saturated, the count-up operation is stopped with respect to the L2 reference frequency counter (step S15).

As mentioned above, in a case of writing data on the L2 cache 5, the L2 cache controller 12 determines whether the data is written on the high-speed region or the low-speed region of the L2 cache 5 based on the measurement value of the L1 reference frequency counter 9 corresponding to this data.

Figure 5:
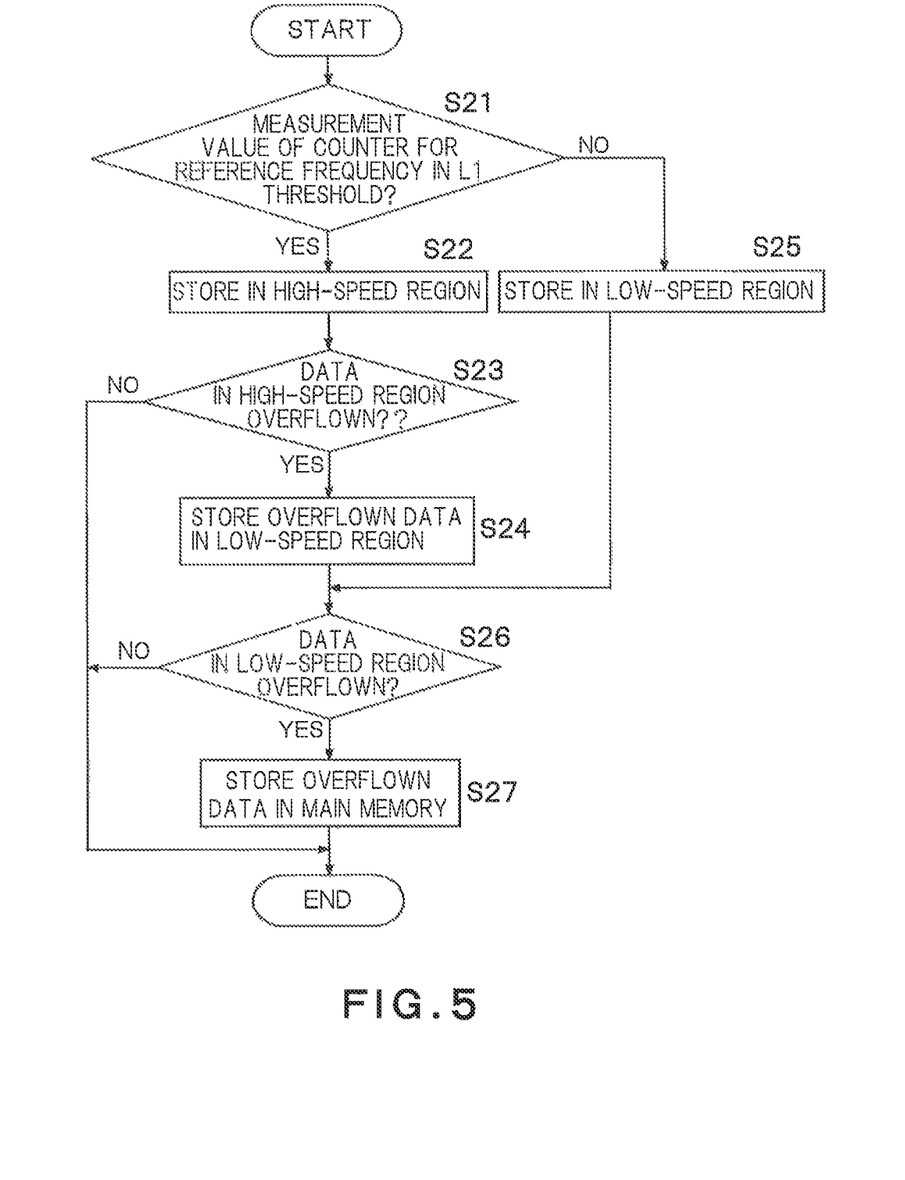
FIG. 5 is a flow chart illustrating an example of processes of a writing control carried out by an L2 cache controller 12.

FIG. 5 is a flow chart illustrating an example of a processing procedure of a writing control carried out by the L2 cache controller 12. First, the L2 cache controller 12 determines whether the measurement value of the L1 reference frequency counter 9 exceeds a predetermined threshold (step S21). When determined that the measurement value is exceeding the threshold, data to be written is stored in the high-speed region (step S22). Next, the high-speed region is determined whether it is full and whether data therein overflows (step S23). In a case where the data overflows, the overflown data is stored in the low-speed region (step S24).

On the other hand, when the measurement value is determined in step S21 that it is not exceeding the threshold, the data to be written is stored in the low-speed region (step S25).

After finishing the processes in step S24 or step S25, the low-speed region is determined whether it is full and whether the data therein overflows (step S26). In a case where the data overflows, the overflown data is stored in the main memory (step S27).

When the data on the high-speed region or the low-speed region in step S22 or step S24 is written, if the high-speed region or the low-speed region is full, it is possible to adopt algorism where data will be evicted in order from data remained in the high-speed region or the low-speed region for the longest period.

On the other hand, in a case where a readout request is issued with respect to the data stored in the high-speed region inside the L2 cache 5, this data will be written on the L1 cache 4. Therefore, it is not necessary to store the data in the high-speed region. Accordingly, the data inside the high-speed region may be transferred to the low-speed region. In this way, the L2 cache 5 functions as a region selection unit (region switch) which writes data into the high-speed region or the low-speed region. As shown in FIG. 2, a number of configuration units (memory cells) used for readout and writing of one bit data is different between the high-speed region and the low-speed region.

Figure 6:
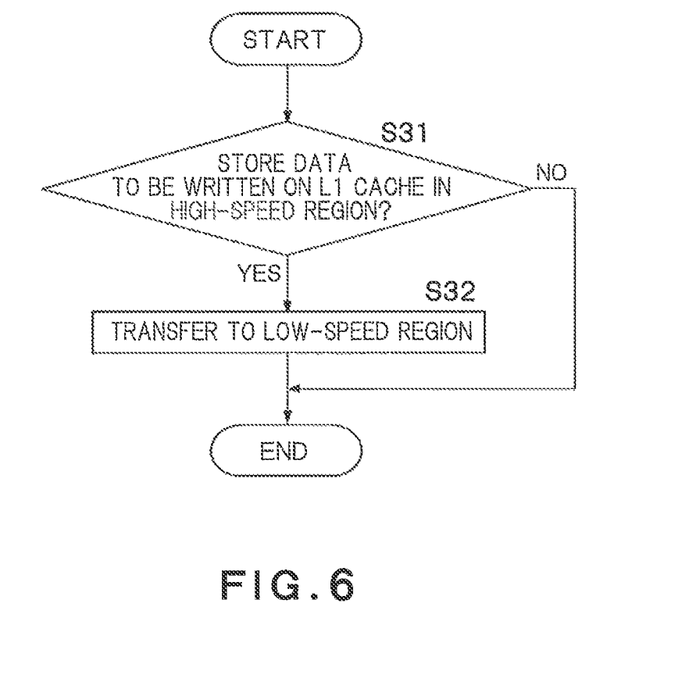
FIG. 6 is a flow chart illustrating an example of processes of the L2 cache controller 12 in a case where a readout request is issued.

FIG. 6 is a flow chart illustrating an example of processes of the L2 cache controller 12 in a case where the readout request is issued with respect to the data inside the L2 cache 5. First, the data to which the readout request has been issued is determined whether it is stored in the high-speed region (step S31). If the data is stored in the high-speed region, the data moves to the low-speed region after being transferred to the L1 cache 4 (step S32). If the data is determined in step S31 that it is stored in the low-speed region, the data is transferred to the L1 cache 4.

The memory capacity of the high-speed region and the low-speed region inside the L2 cache 5 can be made changeable in accordance with access conditions. For example, in a case where the L2 cache 5 is a set associative cache memory, the L2 cache 5 includes a plurality of ways. Therefore, the high-speed region or the low-speed region may be switchable per way in accordance with the access conditions.

In a general cache memory, when evicting clean data from a cache memory, it is not necessary to write back the data on a lower-level memory. However, in the present embodiment, as mentioned above, in accordance with the access conditions in the higher-level, data will be determined whether it should be stored in the high-speed region or the low-speed region in the lower-level cache memory. Therefore, even when evicting the clean data from the higher-level cache memory, a reference number of the data will be reflected to the lower-level cache memory. Depending on the reference number, the data evicted from the higher-level will be determined whether it should be stored in the high-speed region or the low-speed region.

Note that in order to reduce a number of unnecessary writing on the nonvolatile memory, when evicting the clean data from the higher-level cache memory of the nonvolatile memory, the data may not be written on the high-speed region. In this case, information indicating the eviction from the higher-level cache memory may be stored in, for example, the tag memory of the lower-level nonvolatile memory.

Figure 7:
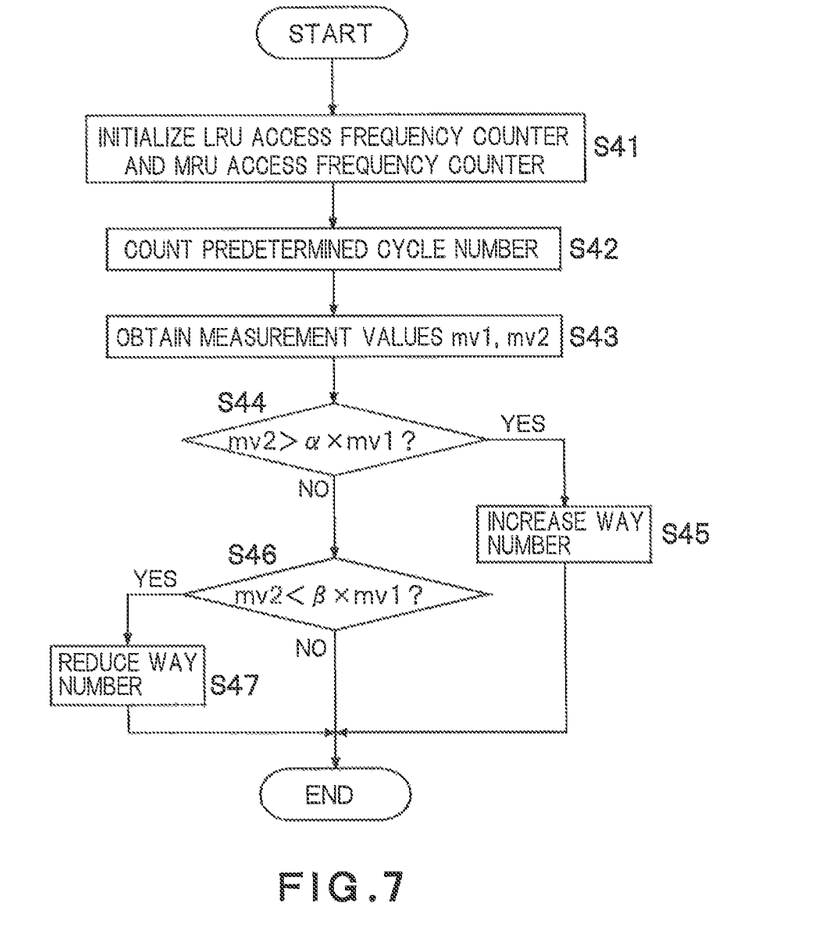
FIG. 7 is a flow chart illustrating an example of processes of controlling and switching memory capacity of a high-speed region and a low-speed region inside a L2 cache 5 in a unit of a way.

FIG. 7 is a flow chart illustrating an example of processes where the L2 cache controller 12 controls and switches the memory capacity of the high-speed region and the low-speed region inside the L2 cache 5 per way. First, the LRU access frequency counter 13 is initialized and the L3 cache 6 is indicated to initialize the MRU access frequency counter 18 (step S41).

Next, a predetermined cycle number of the processor core 3 is counted (step S42). The predetermined cycle number may be any number, for example, 1M cycle. During this cycle number, measurement values of the LRU access frequency counter 13 and the MRU access counter are consecutively updated.

After finishing counting the predetermined cycle number, the L2 cache controller 12 obtains a measurement value mv1 of the LRU access frequency counter 13 and a measurement value mv2 of the MRU access frequency counter 18 (step S43).

Next, the L2 cache controller 12 determines whether mv2>α×mv1 (step S44). Herein, α represents a coefficient including a real number which can be set appropriately and is set, for example, α=1.0.

If a result determined in step S44 is "YES," it indicates that access frequency with respect to the L3 cache 6 is larger than that of the L2 cache 5. In this case, with regard to the next 1M cycle number, the way number is increased so as to increase proportion of the low-speed region in the L2 cache 5 (step S45).

If the result determined in step S44 is "NO," it is determined whether mv2<β×mv1 (step S46). Herein, β represents a coefficient including a real number which can be set appropriately and is set, for example, β=0.4.

If the result determined in step S46 is "YES," it indicates that the access frequency with respect to the L2 cache 5 is larger than that of the L3 cache 6. In this case, with regard to the next 1M cycle number, the way number is decreased so as to increase proportion of the high-speed region in the L2 cache 5 (step S47).

The aforementioned coefficients α and β are necessarily set appropriately depending on the memory capacity of the L2 cache 5 and the L3 cache 6, access performance to be requested, power consumption, and the like.

In this manner, in the present embodiment, in accordance with the access conditions with respect to the cache memory in the higher-level of the nonvolatile memory including the cache memory (for example, L2 cache 5), the data to be stored in the nonvolatile memory is determined whether it should be stored in the high-speed region or the low-speed region inside the nonvolatile memory. As a result, it is possible to store in the high-speed region data having a high possibility that it will be accessed in the future. Therefore, it is possible to improve the access performance. Furthermore, operating the nonvolatile memory with high-speed increases the power consumption. However, in the present embodiment, limited memory capacity inside the nonvolatile memory can be used as the high-speed region in accordance with the access conditions with respect to the cache memory in the higher-level of the nonvolatile memory so that the power consumption can be reduced.

Furthermore, according to the present embodiment, in a case where the data is evicted from the higher-level cache memory of the nonvolatile memory, the data is determined whether it should be stored in the high-speed region or the low-speed region inside the nonvolatile memory in accordance with the access conditions of the data. Therefore, it is possible to reliably store, in the high-speed region, the data having the high possibility of re-access.

Furthermore, in a case where the readout request is issued with respect to the data stored in the high-speed region inside the nonvolatile memory, the data is transferred to the cache memory in the higher-level and also moves to the low-speed region inside the nonvolatile memory. Therefore, it is possible to make a space in the high-speed region so that the limited high-speed region can be used effectively.

Furthermore, the LRU access frequency counter 13 is provided inside the cache memory (for example, L2 cache 5) including the nonvolatile memory, and also the MRU access frequency counter 18 is provided inside the cache memory (for example, L3 cache 6) in the lower-level of the former cache memory. Therefore, it is possible to arbitrarily adjust the proportion of the high-speed region and the low-speed region inside the nonvolatile memory based on the measurement values of these counters. Therefore, it is possible to optimize the proportion of the high-speed region and the low-speed region inside the nonvolatile memory in accordance with application executed by the processor core 3, memory capacity of the nonvolatile memory, access speed to be requested, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A cache memory system comprising:
    a first cache memory;
    a second cache memory which comprises a nonvolatile memory capable of generating a plurality of regions having different access speeds and has access priority lower than the first cache memory; and
    a cache controller which carries out a control where data to be stored in the second cache memory is sorted to the plurality of regions and stored thereto in accordance with access conditions with respect to the first cache memory,
    wherein the plurality of regions comprises a first region and a second region whose access speed is lower than access speed of the first region,
    the cache memory system comprises first access frequency measurement circuitry which measures access frequency of data stored in the first cache memory, and
    the cache controller stores, in the first region, data whose write access frequency measured by the first access frequency measurement circuitry exceeds a predetermined threshold and stores, in the second region, data whose access frequency does not exceed the threshold, determines whether data to be read is stored in the first cache memory and the first region, and evicts the data determined to be stored in the first cache memory and the first region from the first region to store the data in the second region.

2. The cache memory system according to claim 1, wherein the cache controller stores data in any one of the plurality of regions, when evicting the data from the first cache memory to the second cache memory, in accordance with access conditions of the data in the first cache memory.

3. The cache memory system according to claim 1, wherein the plurality of regions comprises a first region and a second region whose access speed is lower than access speed of the first region, and
    the cache controller moves a part of data stored in the first region to the second region when no space is left in the first region.

4. The cache memory system according to claim 1, wherein the plurality of regions comprises a first region and a second region whose access speed is lower than access speed of the first region, and
    the cache controller moves data from the first region to the second region when a readout request is issued with respect to the data stored in the first region.

5. The cache memory system according to claim 1, wherein the first access frequency measurement circuitry is provided per cache line to access the first cache memory.

6. The cache memory system according to claim 5, wherein the first access frequency measurement circuitry increments a measurement value whenever a corresponding cache line is accessed until the access frequency reaches a predetermined value, and after the access frequency reaches the predetermined value, in a case where another access occurs, the first access frequency measurement circuitry decrements a measurement value of the first access frequency measurement circuitry other than the first access frequency measurement circuitry whose access frequency has reached the predetermined value.

7. The cache memory system according to claim 1, comprising:

a third cache memory which has access priority lower than the second cache memory;
second access frequency measurement circuitry which measures access frequency of data with next highest possibility of eviction in the second cache memory; and
third access frequency measurement circuitry which measures access frequency of data with next lowest possibility of eviction in the third cache memory,
wherein the cache controller controls memory sizes of the plurality of regions based on the access frequency measured by the second access frequency measurement circuitry and the access frequency measured by the third access frequency measurement circuitry.

8. The cache memory system according to claim 7, wherein the second cache memory comprises a plurality of ways, the way comprising a plurality of cache lines, and
the cache controller comprises a way allocation controller which controls allocation of the plurality of ways to the plurality of regions, based on the access frequency measured by the second access frequency measurement circuitry and the access frequency measured by the third access frequency measurement circuitry.

9. The cache memory system according to claim 1,
wherein the second cache memory comprises a memory cell array comprising a plurality of memory cells, the memory cell comprising a transistor and a variable resistance device, and a region switch which switches a number of the memory cells used for readout and writing of 1-bit data, and
the cache controller controls the region switch in accordance with the access conditions with respect to the first cache memory.

10. A processor system comprising:
a first cache memory;
a second cache memory which comprises a nonvolatile memory capable of generating a plurality of regions having different access speeds and has access priority lower than the first cache memory; and
a cache controller which carries out a control where data to be stored in the second cache memory is sorted to the plurality of regions and stored thereto in accordance with access conditions with respect to the first cache memory,
wherein the plurality of regions comprises a first region and a second region whose access speed is lower than access speed of the first region,
the cache memory system comprises first access frequency measurement circuitry which measures access frequency of data stored in the first cache memory, and
the cache controller stores, in the first region, data whose write access frequency measured by the first access frequency measurement circuitry exceeds a predetermined threshold and stores, in the second region, data whose access frequency does not exceed the threshold, determines whether data to be read is stored in the first cache memory and the first region, and evicts the data determined to be stored in the first cache memory and the first region from the first region to store the data in the second region.

11. The processor system according to claim 10, wherein the cache controller stores data in any one of the plurality of regions, when evicting the data from the first cache memory to the second cache memory, in accordance with access conditions of the data in the first cache memory.

12. The processor system according to claim 10, wherein the plurality of regions comprises a first region and a second region whose access speed is lower than access speed of the first region, and
the cache controller moves a part of data stored in the first region to the second region when no space is left in the first region.

13. The processor system according to claim 10, wherein the plurality of regions comprises a first region and a second region whose access speed is lower than access speed of the first region, and
the cache controller moves data from the first region to the second region when a readout request is issued with respect to the data stored in the first region.

14. The processor system according to claim 10, wherein the first access frequency measurement circuitry is provided per cache line to access the first cache memory.

15. The processor system according to claim 14, wherein the first access frequency measurement circuitry increments a measurement value whenever a corresponding cache line is accessed until the access frequency reaches a predetermined value, and after the access frequency reaches the predetermined value, in a case where another access occurs, the first access frequency measurement circuitry decrements a measurement value of the first access frequency measurement circuitry other than the first access frequency measurement circuitry whose access frequency has reached the predetermined value.

16. The processor system according to claim 10, comprising:
a third cache memory which has access priority lower than the second cache memory;
second access frequency measurement circuitry which measures access frequency of data with next highest possibility of eviction in the second cache memory; and
third access frequency measurement circuitry which measures access frequency of data with next lowest possibility of eviction in the third cache memory,
wherein the cache controller controls memory sizes of the plurality of regions based on the access frequency measured by the second access frequency measurement circuitry and the access frequency measured by the third access frequency measurement circuitry.

17. The processor system according to claim 16, wherein the second cache memory comprises a plurality of ways, the way comprising a plurality of cache lines, and
the cache controller comprises a way allocation controller which controls allocation of the plurality of ways to the plurality of regions, based on the access frequency measured by the second access frequency measurement circuitry and the access frequency measured by the third access frequency measurement circuitry.

18. The processor system according to claim 10,
wherein the second cache memory comprises a memory cell array comprising a plurality of memory cells, the memory cell comprising a transistor and a variable resistance device, and a region switch which switches a number of the memory cells used for readout and writing of 1-bit data, and
the cache controller controls the region switch in accordance with the access conditions with respect to the first cache memory.

* * * * *